J. WHITEHEAD.
Seed Planter.
No. 17,402.
Patented May 26, 1857.
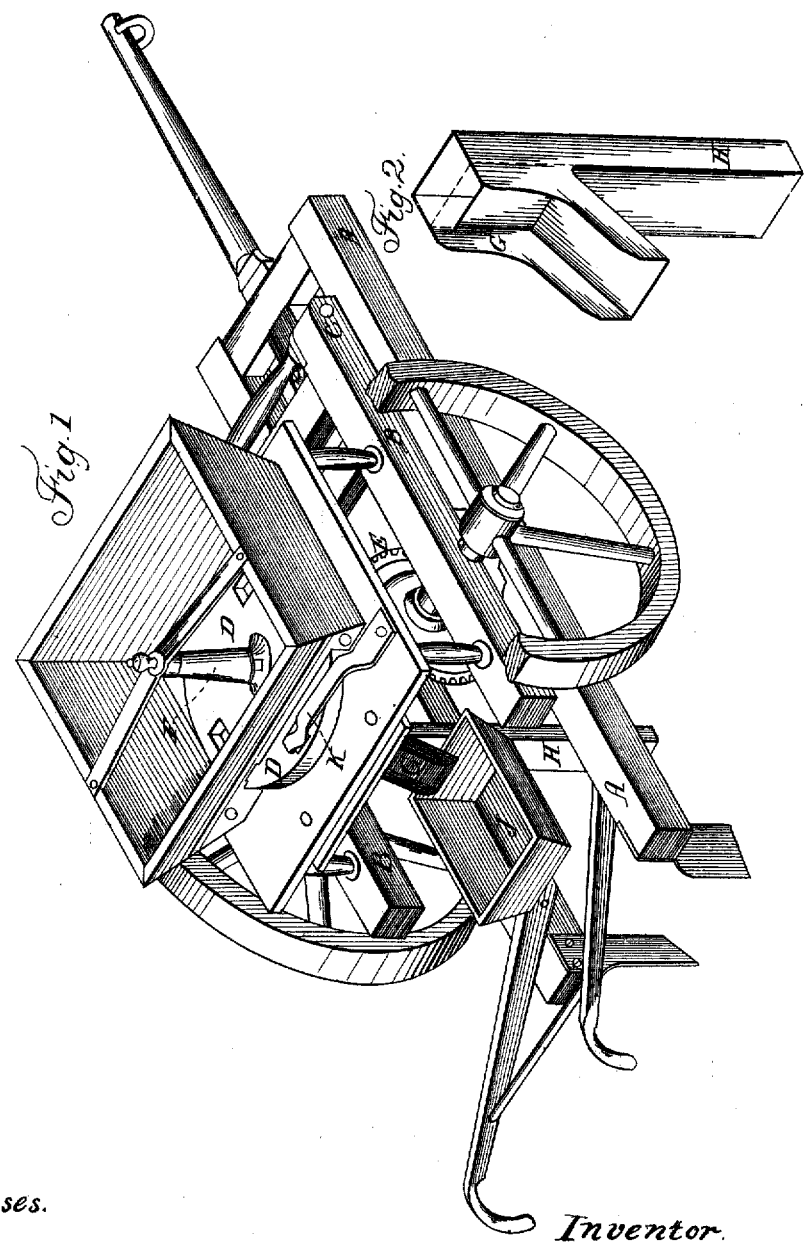
Witnesses.
Inventor.

UNITED STATES PATENT OFFICE.

JESSE WHITEHEAD, OF MANCHESTER, VIRGINIA.

IMPROVEMENT IN SEED-PLANTERS.

Specification forming part of Letters Patent No. 17,402, dated May 26, 1857.

*To all whom it may concern:*

Be it known that I, JESSE WHITEHEAD, of Manchester, in the county of Chesterfield and State of Virginia, have invented certain new and useful Improvements in Machines for Planting Seed; and I do hereby declare the following to be a full, clear, and exact description of the construction and operation of the same, reference being had to the accompanying drawings, making a part of this specification, in which—

Figure 1 represents a perspective view of the machine. Fig. 2 represents the grain-trough detached from the machine to better show its dividing-edge.

The nature of my invention relates to the application of a peculiarly-constructed grain-trough in connection with a seeding apparatus which has large apertures, so that more seed or grain may pass out of the hopper than it is desirable to plant, but which excess is separated from that which is to be planted by the dividing-trough, and caught in a proper receptacle to be again thrown into the hopper.

The necessity of this invention arises from the fact that if seed cells or apertures are made of just such a size or area as will hold the exact quantity of seed that is to be dropped into the ground at each operation of the machine such apertures or cells will choke, and cause irregular planting. Now, I propose to obviate this defect by allowing, say, twice as much grain as is actually necessary to do the planting to pass out of the hopper, and dividing that which is to be planted from the excess of quantity after it has passed out of the hopper, and carrying the excess to a proper receptacle, while the other portion passes into the ground.

To enable others skilled in the art to make and use my invention, I will proceed to describe the same with reference to the drawings.

A represents a frame, to the forward end of which the horses, or whatever are to draw it, may be hitched. A colter or share is also attached to the front of this frame for opening a furrow, into which the seeds are to be dropped, and to the rear of the frame are connected wings or scrapers, that throw the earth over the furrow in which the seed has' been deposited. Handles are also attached to the rear of this frame for the operator to guide and control the machine.

B is a second frame, hinged or pivoted to the frame A at the point C. This frame B is supported on a pair of carrying-wheels, and can thus freely rise with said wheels over any inequalities in the ground, while the operator can hold the other frame, A, to the ground and keep its colter or share properly introduced therein for opening the furrow or for covering it. One of the carrying-wheels should be fast on the axle of the machine, so that they may turn together, and on the said axle a bevel-wheel, E, is placed, which takes into and turns a bevel-pinion on the lower end of the shaft F, which passes up through the hopper.

To the shaft F is connected a distributing-plate, D, provided with any suitable number of cells or openings, and this plate D rotates partially through the hopper, so as to receive in its cells the charges of grain that are to be carried out of the hopper, and, continuing to revolve, it brings said charges over a trough, G, into which they drop, or are forced by a spring, K, which drops into each cell in succession as it comes around over the trough.

The trough G has a branch, H, through which the seed that is to be planted drops into the ground prepared for it, while the excess of seed that has been brought out of the hopper passes through the trough G into the receptacle J, from whence it is again thrown into the hopper. The trough G is made adjustable on the frame A, so that it may be moved to or from the center of the aperture through which the grain falls into it, and it is divided from the trough or branch H by a sharp-edged division-plate, which separates the seed that passes into and through the spout H from that which is to pass through the trough G into the receptacle J. This sharp-edged division-plate can be so set or adjusted as to perfectly regulate the quantity of seed that is to pass into the ground, and to separate it from the bulk that passes out of the hopper.

Having thus fully described the nature of my invention, what I claim therein as new, and desire to secure by Letters Patent, is—

The combination of the trough G with its spout H and receptacle J, when used in connection with a seeding apparatus for the purpose of dividing and retaining the excess of seed from that which is to be planted, substantially as herein set forth and explained.

JESSE WHITEHEAD.

Witnesses:
WM. BRADLEY,
COMALL BRADLEY.